United States Patent
Namba

(10) Patent No.: US 11,123,610 B2
(45) Date of Patent: Sep. 21, 2021

(54) RESIN COMPOSITION FOR GOLF BALLS, AND GOLF BALL

(71) Applicant: Bridgestone Sports Co., Ltd., Tokyo (JP)

(72) Inventor: Atsushi Namba, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 72 days.

(21) Appl. No.: 16/689,309

(22) Filed: Nov. 20, 2019

(65) Prior Publication Data
US 2020/0179764 A1    Jun. 11, 2020

(30) Foreign Application Priority Data

Dec. 6, 2018    (JP) .............................. JP2018-229050

(51) Int. Cl.
| | |
|---|---|
| *A63B 37/00* | (2006.01) |
| *C08L 33/08* | (2006.01) |
| *C08L 29/02* | (2006.01) |
| *C08L 23/08* | (2006.01) |
| *C08L 25/02* | (2006.01) |
| *C08L 61/02* | (2006.01) |
| *C08K 5/17* | (2006.01) |
| *C08K 5/00* | (2006.01) |

(52) U.S. Cl.
CPC ...... *A63B 37/0024* (2013.01); *A63B 37/0031* (2013.01); *C08L 23/0815* (2013.01); *C08L 23/0876* (2013.01); *C08L 25/02* (2013.01); *C08L 29/02* (2013.01); *C08L 33/08* (2013.01); *C08L 61/02* (2013.01); *C08K 5/0025* (2013.01); *C08K 5/17* (2013.01)

(58) Field of Classification Search
CPC .. C08L 23/0815; C08L 23/0876; C08L 29/02; C08L 33/08; C08L 25/02; C08L 61/02; C08L 2205/08; A63B 37/0075; A63B 37/0043; A63B 37/0074; A63B 37/0039; A63B 37/0031; A63B 37/0024; A63B 37/0033; A63B 37/0064; A63B 37/0065; A63B 37/0087; C08K 5/0025; C08K 5/17
See application file for complete search history.

(56) References Cited

U.S. PATENT DOCUMENTS

| | | | |
|---|---|---|---|
| 2010/0125001 A1 | 5/2010 | Egashira et al. | |
| 2018/0178077 A1 | 6/2018 | Nanba | |

FOREIGN PATENT DOCUMENTS

| | | | | |
|---|---|---|---|---|
| GB | 1210698 A | * | 10/1970 | ........... A63B 37/008 |
| JP | 2010-119837 A | | 6/2010 | |
| JP | 2018-102779 A | | 7/2018 | |

* cited by examiner

*Primary Examiner* — Angela C Scott
(74) *Attorney, Agent, or Firm* — Sughrue Mion, PLLC

(57) ABSTRACT

A golf ball resin composition includes (a) an olefin-α,β-unsaturated carboxylic acid copolymer and/or a metal ion neutralization product thereof or an olefin-α,β-unsaturated carboxylic acid-α,β-unsaturated carboxylic acid ester copolymer and/or a metal ion neutralization product thereof, (b) a phenolic resin and (c) a compound having at least two oxazoline groups per molecule, wherein the content of component (C) is from 0.1 to 5 parts by weight per 100 parts by weight of components (a) and (b) combined. The resin composition has excellent tensile properties and, when used in a golf ball, provides the ball with an excellent durability without lowering the spin performance and distance performance of the ball. The resin is especially useful as a golf ball cover material for an outermost layer or an intermediate layer.

18 Claims, 1 Drawing Sheet

RESIN COMPOSITION FOR GOLF BALLS, AND GOLF BALL

CROSS-REFERENCE TO RELATED APPLICATION

This non-provisional application claims priority under 35 U.S.C. § 119(a) on Patent Application No. 2018-229050 filed in Japan on Dec. 6, 2018, the entire contents of which are hereby incorporated by reference.

TECHNICAL FIELD

The present invention relates to a resin composition for golf balls and to a golf ball in which the composition is used. More specifically, the invention relates both to a resin composition which can be suitably used as the intermediate layer material in golf balls having a core and a cover of two or more layers that include at least an intermediate layer and an outermost layer, and also to a golf ball in which such a composition is used.

BACKGROUND ART

In recent years, solid golf balls having a multilayer structure of three or more pieces have come to be commonly used, and four-piece solid golf balls having a core encased by a cover of three or more layers which include an envelope layer, an intermediate layer and an outermost layer have also appeared on the market. These multilayer golf balls are generally produced by consecutively injection-molding synthetic resin cover materials over a core so as to form successive layers on the core. However, when adhesion among the golf ball layers is poor, this may adversely affect ball properties such as the flight, spin on approach shots, feel at impact and durability to cracking. Accordingly, there exists a desire to improve the adhesion between the individual layers.

Ionomeric resins are often used as golf ball materials. In addition, JP-A 2018-102779 discloses art which includes an oxazoline group-containing polymer within an ionomeric resin in order to increase golf ball durability and also increase bond strength and adhesion between the ball layers.

JP-A 2010-119837 discloses art relating to an ionomer composition in which an ionomer component serves as the primary resin component and which, by including a phenolic resin, has an increased material hardness and enhanced resilience and durability.

However, even further improvement in durability than that afforded by the above golf ball resin compositions is desired.

SUMMARY OF THE INVENTION

It is therefore an object of the present invention to provide golf ball resin compositions and golf balls made therewith having an even further improved durability without lowering the spin performance and the distance performance of the ball.

As a result of extensive investigations, we have discovered that by including an olefin-$\alpha,\beta$-unsaturated carboxylic acid copolymer and/or a metal ion neutralization product thereof or an olefin-$\alpha,\beta$-unsaturated carboxylic acid-$\alpha,\beta$-unsaturated carboxylic acid ester copolymer and/or a metal ion neutralization product thereof, a phenolic resin and a compound having at least two oxazoline groups per molecule, and by adjusting the content of the oxazoline group-containing compound within a specific range, the Shore D hardness of this resin composition can be made higher than that of a resin material which consists solely of the above acid-containing resins and does not include the phenolic resin and the oxazoline group-containing compound, and the tensile properties can also be increased. Moreover, we have found that, in cases where this resin composition is employed in a golf ball component, the ball durability can be even further improved without declines in the spin performance and distance performance of the ball, and that, in particular, the durability of the golf ball can be enhanced in cases where this golf ball material is used as the material for an intermediate layer interposed between the core and the outermost layer.

Accordingly, in a first aspect, the invention provides a golf ball resin composition which includes (a) an olefin-$\alpha,\beta$-unsaturated carboxylic acid copolymer and/or a metal ion neutralization product thereof, or an olefin-$\alpha,\beta$-unsaturated carboxylic acid-$\alpha,\beta$-unsaturated carboxylic acid ester copolymer and/or a metal ion neutralization product thereof, (b) a phenolic resin and (c) a compound having at least two oxazoline groups per molecule, wherein the content of component (c) is from 0.1 to 5 parts by weight per 100 parts by weight of components (a) and (b) combined.

In a preferred embodiment of the golf ball resin composition according to the first aspect of the invention, the content of component (b) is from 1 to 20 wt % per 100 wt % of components (a) and (b) combined.

In another preferred embodiment of the resin composition of the invention, component (b) is a novolak-type phenolic resin.

In yet another preferred embodiment, the resin composition further includes (d) a curing agent. Component (d) is preferably hexamethylenetetramine. The content of component (d) is preferably from 0.1 to 5 parts by weight per 100 parts by weight of components (a) and (b) combined.

In still another preferred embodiment, of the $\alpha,\beta$-unsaturated carboxylic acid monomer serving as a constituent of the copolymer of component (a), the proportion that is not neutralized with metal ions is at least 18 wt % per 100 wt % of the copolymer of component (a).

In a further preferred embodiment, component (a) is an ethylene-$\alpha,\beta$-unsaturated carboxylic acid copolymer and/or a metal ion neutralization product thereof.

In a yet further preferred embodiment of the golf ball resin composition of the invention, in a stress-strain curve representing the relationship between stress (S) and strain ($\gamma$) obtained by measurement in accordance with JIS K 7161-1 (Determination of Tensile Properties), letting Y be an upper yield point and B be a breaking point, expressing the relationship between stress (S) and strain ($\gamma$) as the function $S=f(\gamma)$, defining $\gamma_Y$ as the strain at the upper yield point, $S_Y$ as the stress at the upper yield point. $\gamma_B$ as the strain at the breaking point and $S_B$ as the stress at the breaking point, and letting R be the specific surface area of the region enclosed by $S=f(\gamma)$ and $S=S_Y$ within the range $\gamma_Y \leq \gamma \leq \gamma_B$, the relationships among the Shore D hardness $H_1$ of the golf ball resin composition, the specific surface area $R_1$ obtained from the stress-strain curve for the golf ball resin composition, the Shore D hardness $H_0$ of a resin material consisting solely of component (a) of the golf ball resin composition and lacking components (b) and (c) and the specific surface area $R_0$ obtained from the stress-strain curve for this resin material satisfy conditions (1) to (3) below $$\Delta R = R_1 - R_0 \qquad (1)$$

$$\Delta H = H_1 - H_0 > 0 \qquad (2)$$

$$\Delta R / \Delta H > -20. \qquad (3)$$

In a second aspect, the invention provides a golf ball having a core of at least one layer and a cover of at least one layer, wherein at least one layer of the cover is formed of the resin composition according to the first aspect of the invention.

In a preferred embodiment of the golf ball according to the second aspect of the invention, the cover is made up of at least two layers, an outermost layer and an intermediate layer interposed between the outermost layer and the core, which intermediate layer is formed of the resin composition according to the first aspect of the invention.

Advantageous Effects of the Invention

The golf ball resin composition of the invention has excellent tensile properties. When used in a golf ball, it provides the golf ball with an excellent durability without lowering the spin performance and distance performance of the ball. This resin composition is especially useful as a golf ball cover material (in the outermost layer and intermediate layer).

BRIEF DESCRIPTION OF THE DIAGRAMS

DESCRIPTION OF THE PREFERRED EMBODIMENTS

Figure 1:
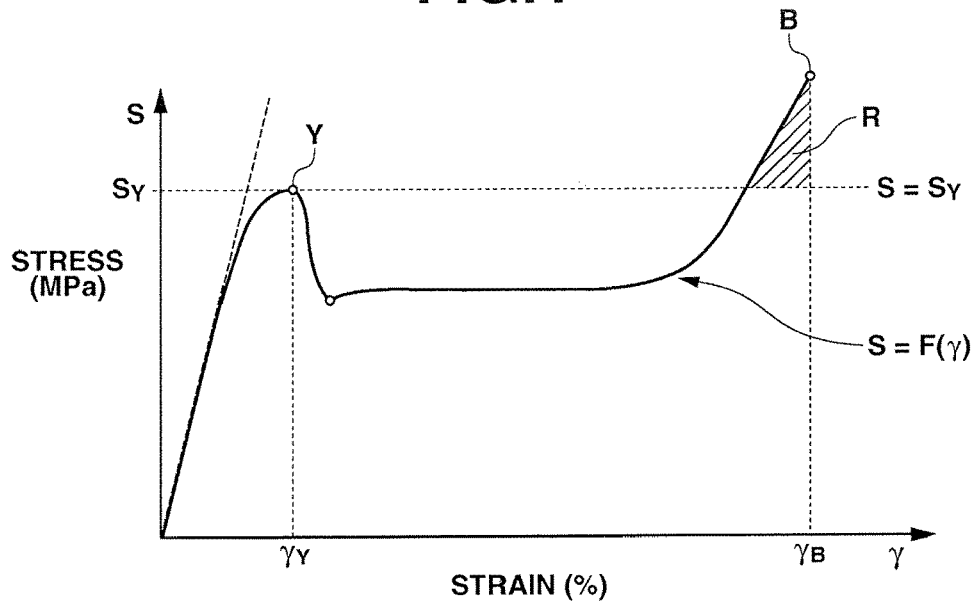
FIG. 1 shows the stress-strain curve of a resin composition according to an embodiment of the invention.

The objects, features and advantages of the invention will become more apparent from the following detailed description taken in conjunction with the appended diagram.

The golf ball resin composition of the invention contains as the chief ingredient (a) an olefin-α,β-unsaturated carboxylic acid copolymer and/or a metal ion neutralization product thereof or an olefin-α,β-unsaturated carboxylic acid-α,β-unsaturated carboxylic acid ester copolymer and/or a metal ion neutralization product thereof. This component (a) is described in detail below.

(a) Olefin-α,β-Unsaturated Carboxylic Acid Copolymer and Metal Ion Neutralization Product Thereof, Olefin-α,β-Unsaturated Carboxylic Acid-α,β-Unsaturated Carboxylic Acid Ester Copolymer and Metal Ion Neutralization Product Thereof Here, the olefin of component (a) is generally one having at least two and up to eight carbon atoms, and preferably one having up to 6 carbon atoms. Specific examples include ethylene, propylene, butene, pentene, hexene, heptene and octene. Ethylene is especially preferred. Specific examples of the unsaturated carboxylic acid in component (a) include acrylic acid, methacrylic acid, maleic acid and fumaric acid. Acrylic acid and methacrylic acid are especially preferred. The unsaturated carboxylic acid ester of component (a) is preferably a lower alkyl ester of the above unsaturated carboxylic acid, specific examples of which include methyl methacrylate, ethyl methacrylate, propyl methacrylate, butyl methacrylate, methyl acrylate, ethyl acrylate, propyl acrylate and butyl acrylate. Butyl acrylate (butyl n-acrylate, butyl i-acrylate) is especially preferred.

Metal ion neutralization products of the copolymer in component (a) can be obtained by partially neutralizing acid groups on the olefin-unsaturated carboxylic acid copolymer or the olefin-unsaturated carboxylic acid-unsaturated carboxylic acid ester copolymer with metal ions. Illustrative examples of metal ions which neutralize the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Preferred use can be made of $Na^+$, $Li^+$, $Zn^{++}$, $Mg^{++}$ and $Ca^{++}$ in particular. Such neutralization products can be obtained by a known method. For example, a neutralization product can be obtained by using, for reaction with the above copolymer, a compound such as a formate, acetate, nitrate, carbonate, bicarbonate, oxide, hydroxide or alkoxide of the above metal ion.

Known substances may be used as component (a). Illustrative examples include commercial products such as the following acid copolymers: Nucrel® N1560, Nucrel® N1214, Nucrel® N1035, Nucrel® AN4221C, Nucrel® AN4311, Nucrel® AN4318 and Nucrel® AN4319 (all products of DuPont-Mitsui Polychemicals Co., Ltd.). Illustrative examples of metal ion neutralization products of acid copolymers include Himilan® 1554, Himilan® 1557, Himilan® 1601, Himilan® 1605, Himilan® 1706, Himilan® AM7311, Himilan® 1855, Himilan® 1856 and Himilan® AM7316 (all products of DuPont-Mitsui Polychemicals Co., Ltd.), and Surlyn® 7930, Surlyn® 6320, Surlyn® 8320, Surlyn® 9320 and Surlyn® 8120 (E.I. DuPont de Nemours and Company).

It is recommended that the content of the unsaturated carboxylic acid (acid content) included in the copolymer of component (a) be preferably at least 15 wt %, more preferably at least 18 wt % and even more preferably at least 20 wt %, and that the upper limit be preferably not more than 30 wt %, and more preferably not more than 25 wt %. When the content of component (a) is low, i.e., when there are few carboxyl groups, the compatibility with the phenolic resin serving as component (b) may worsen and a sufficient durability may not be obtained.

(b) Phenolic Resin

Next, the phenolic resin serving as component (b) is described. The phenolic resin is not particularly limited. For example, novolak-type phenolic resins and resole-type phenolic resins may be used. Particularly in the practice of the invention, from the standpoint of achieving both a curing action and durability, the use of a novolak-type phenolic resin is preferred. Examples of commercial products include those having the product names PR-50731, PR-7031A and PR-217 from Sumitomo Bakelite Co., Ltd., and that having the product name Tamanol 526 from Arakawa Chemical Industries, Ltd.

The content of component (b), although not particularly limited, is preferably from 1 to 20 wt % per 100) wt % of components (a) and (b) combined. Outside of this range, a hardness-improving effect and a durability-enhancing effect may not be achievable.

(c) Compound Having at Least Two Oxazoline Groups Per Molecule

Component (c) is a compound having oxazoline groups. This ingredient plays the role of a compatibilizing agent between the ionomer or other acid-containing copolymer serving as component (a) and the phenolic resin serving as component (b). The oxazoline group-containing compound is preferably an oxazoline group-containing acrylic polymer or an oxazoline group-containing styrene polymer. Component (c) improves the properties of the golf ball resin composition of the invention, particularly the tensile properties and the Shore D hardness, primarily because the oxazoline groups therein react with carboxyl groups on the copolymer of component (a) to form chemical bonds and moreover because it is able to uniformly disperse the phenolic resin within the ionomer.

From the standpoint of, for example, compatibility with the ionomer, the content of oxazoline groups in the compound serving as component (c) is preferably from $0.1 \times 10^{-3}$ to $10 \times 10^{-3}$ mol/g (solids), and especially from $0.2 \times 10^{-3}$ to $8 \times 10^{-3}$ mol/g (solids), per 1.0 g of the above compound.

The content of component (c) is suitably selected according to the amount of oxazoline groups per molecule and the molecular weight of component (c), the content of component (a) and the amount of acid groups in component (a), the amount in which the phenolic resin serving as component (b) is added and also the resin composition kneading conditions. This content is preferably from 0.1 to 5 parts by weight per 100 parts by weight of the combined amount of components (a) and (b). When this content is higher or lower than the above range, the compatibility between the ionomer or other resin of component (a) and the phenolic resin of component (b) worsens, and the desired golf ball durability cannot be obtained.

A commercial product may be used as the polymer of component (c). Illustrative examples include Epocros RPS 1005, the Epocros WS Series and the Epocros K-2000 series, all of which are products of Nippon Shokubai Co., Ltd.

In the practice of this invention, a curing agent may be additionally included as component (d). This curing agent cures the phenolic resin serving as component (b) that has been added to the ionomer or other acid-containing resin, thereby giving an even harder resin composition. It is especially preferable to use hexamethylenetetramine as this curing agent. The curing agent serving as component (d) is added in an amount which is preferably from 0.1 to 5 parts by weight per 100 parts by weight of components (a) and (b) combined. When the amount of addition is too high, the curing action is high, but the resulting resin composition may have a lower impact resistance. On the other hand, when this curing agent is added in too small an amount or is not added at all, the curing action becomes low and the desired golf ball performance may not achieved. In addition, from the standpoint of obtaining the desired tensile properties and golf ball durability of this invention, the curing agent serving as component (d) is added in an amount relative to the phenolic resin (b), expressed as the compounding ratio (b)/(d), that is preferably from 0.1 to 10 (weight ratio), more preferably from 1.0 to 9.0, and even more preferably from 2.0 to 8.0.

Various additives may be optionally included in the resin composition of the invention. For example, pigments, dispersants, antioxidants, light stabilizers, ultraviolet absorbers and internal mold lubricants may be suitably included.

The resin composition of the invention can be obtained by mixing together the various above ingredients using, for example, any of various types of mixers, such as a kneading-type single-screw or twin-screw extruder, a Banbury mixer or a kneader.

The resin composition of the invention has a material hardness, expressed on the Shore D hardness scale, of preferably at least 50, more preferably at least 55, and even more preferably at least 60. The upper limit is preferably not more than 72, more preferably not more than 70, and even more preferably not more than 68.

The resin composition of the invention includes above components (a) to (c) and optionally includes also component (d). Within the above-described preferred range in Shore D hardness, compared with a resin material consisting solely of component (a) (i.e., a resin material of component (a) alone in which components (b) to (d) are not blended), the resin composition of the invention has a comparable or higher Shore D hardness value, with no decrease in hardness, in addition to which the tensile properties can be increased. That is, it is preferable for the Shore D hardness $H_1$ of the resin composition of the invention and the Shore D hardness $H_0$ of a resin material consisting solely of component (a) of this resin composition and not containing components (b) and (c) to satisfy the following relationship:

$$\Delta H = H_1 - H_0 > 0 \quad (2).$$

The stress-strain curve representing the relationship between stress (S) and strain ($\gamma$) obtained by measurement in accordance with JIS K 7161-1 (Determination of Tensile Properties) for the resin composition of the invention is explained in conjunction with FIG. 1. This stress-strain curve has an upper yield point Y and a breaking point B. Expressing the relationship between stress (S) and strain ($\gamma$) as the function $S=f(\gamma)$ and letting $\gamma_Y$ be the strain at the upper yield point, $S_Y$ be the stress at the upper yield point, $\gamma_B$ be the strain at the breaking point and $S_B$ be the stress at the breaking point, within the range $\gamma_Y \leq \gamma \leq \gamma_B$, a region enclosed by $S=f(\gamma)$ and $S=S_Y$ (the shaded area in the diagram) is obtained. The surface area of this region is R.

Expressing the relationship between the specific surface area $R_1$ obtained from the stress-strain curve for the resin composition of the invention and the specific surface area $R_0$ obtained from the stress-strain curve for a resin material that consists only of component (a) of the resin composition and does not include components (b) and (c) as formula (1) below $$\Delta R = R_1 - R_0 \quad (1)$$

and using $\Delta H$ from the hardness relationship in formula (2) above, it is preferable for the following to be satisfied:

$$\Delta R / \Delta H > -20. \quad (3)$$

Compared with a resin material that uses component (a) alone, a resin composition that satisfies formula (3) can be cured while uniformly dispersing the phenolic resin in the ionomeric resin. As a result, it has an excellent impact resistance and provides golf balls with an excellent durability to cracking. In above formula (3), the $\Delta R / \Delta H$ value is preferably higher than $-20$, more preferably $-10$ or higher, and even more preferably 0 or higher. Also, in above formula (1), $\Delta R$ is preferably higher than $-5$, more preferably 0 or higher, and still more preferably 5 or higher.

The golf ball resin composition of the invention can be used in particular as the cover material in two-piece solid golf balls having a core and a cover encasing the core, or as cover materials (for the intermediate layer and outermost layer) in multi-piece solid golf balls made up of a core of one or more layer and a multilayer cover encasing the core.

The components of golf balls in which the resin composition of the invention is used are described below.

The core may be formed using a known rubber material as the base material. Known base rubbers, such as natural rubber or synthetic rubber, may be used as the base rubber. More specifically, the use of polybutadiene, especially cis-1,4-polybutadiene having a cis structure content of at least 40%, is recommended. If desired, natural rubber, polyisoprene rubber, styrene-butadiene rubber or the like may be used together with the foregoing polybutadiene in the base rubber.

The polybutadiene may be synthesized with a metal catalyst, such as a neodymium or other rare-earth catalyst, a cobalt catalyst or a nickel catalyst.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be included in the base rubber. If necessary, commercial antioxidants and the like may also be suitably added.

The core has a diameter which is suitably selected according to the ball construction. Although not particularly limited, the core diameter is preferably at least 20 mm, more preferably at least 25 mm, and even more preferably at least 30 mm. The upper limit is preferably not more than 41 mm, and more preferably not more than 40 mm.

The core has a deflection, which is the amount of deformation when the core is compressed under a final load of 1,275 N (130 kgf) from an initial load state of 98 N (10 kgf), of preferably at least 2.7 mm, more preferably at least 3.0 mm, and even more preferably at least 3.3 mm. The upper limit is preferably not more than 4.0 mm, and more preferably not more than 3.8 mm. When the amount of deformation is too small, the feel of the ball at impact becomes too hard. On the other hand, when the amount of deformation is too large, the feel at impact may be too soft or the durability to cracking on repeated impact may worsen.

An intermediate layer may be provided between the core and the outermost layer of the cover. In this case, the material hardness of the intermediate layer, although not particularly limited, may be set to a value on the Shore D hardness scale of at least 50, preferably at least 55, and more preferably at least 60. Although there is no particular upper limit, the material hardness may be set to a value on the Shore D hardness scale of preferably 70 or less, and more preferably 65 or less.

The outermost layer of the cover has a thickness which, although not particularly limited, is preferably at least 0.3 mm, more preferably at least 0.4 mm, and even more preferably at least 0.5 mm. The upper limit is preferably 1.2 mm or less, more preferably 1.0 mm or less, and even more preferably 0.8 mm or less.

The outermost layer has a material hardness which, although not particularly limited, may be set to a value on the Shore D hardness scale of at least 25, and preferably at least 30. The upper limit may be set to preferably 65 or less, more preferably 60 or less, and even more preferably 55 or less.

The ball has a deflection, defined as the amount of deformation when the ball is compressed under a final load of 1,275 N (130 kgf) from an initial load state of 98 N (10 kgf), of preferably at least 2.0 mm, and more preferably at least 2.1 mm. The upper limit is preferably not more than 4.0 mm, and more preferably not more than 3.8 mm. When the amount of deformation is too small, the feel of the ball at impact may become too hard. On the other hand, when the amount of deformation is too large, the feel at impact may be too soft or the durability to cracking on repeated impact may worsen.

Numerous dimples of one, two or more types may be formed on the surface of the cover. Also, various types of coatings may be applied to the cover surface. Because the coating must be capable of enduring the harsh conditions of golf ball use, a two-part curable urethane coating, especially a non-yellowing urethane coating, is preferred.

EXAMPLES

The following Examples and Comparative Examples are provided to illustrate the invention, and are not intended to limit the scope thereof.

Examples 1 to 4, Comparative Examples 1 to 7

As shown in Table 1 below, solid cores having a diameter of 38.5 mm were produced in each Example using the rubber composition shown below, which was common to all the Examples, and vulcanizing at 155° C. for 15 minutes. The amount of deformation (deflection) by the core when placed on a steel plate under temperature conditions of 23±1° C. and compressed under a final load of 1,275 N (130 kgf) from an initial load of 98 N (10 kgf) was 3.5 mm.

TABLE 1

| Rubber composition for cores (parts by weight) | C1 |
| --- | --- |
| cis-1,4-Polybutadiene | 100 |
| Zinc acrylate | 27 |
| Zinc oxide | 4 |
| Barium sulfate | 16.5 |
| Antioxidant | 0.1 |
| Organic peroxide (1) | 0.6 |
| Organic peroxide (2) | 1.2 |
| Zinc salt of pentachlorothiophenol | 0.4 |
| Zinc stearate | 3 |

Details on the above core material are given below.

cis-1,4-Polybutadiene: Available under the trade name "BR01" from JSR Corporation Zinc acrylate: Available from Nippon Shokubai Co., Ltd.

Zinc oxide: Available from Sakai Chemical Co., Ltd.

Barium sulfate: Available from Sakai Chemical Co., Ltd.

Antioxidant: Available under the trade name "Nocrac NS6" from Ouchi Shinko Chemical Industry Co., Ltd.

Organic peroxide (1): Dicumyl peroxide, available as "Percumyl D" from NOF Corporation Organic peroxide (2): Mixture of 1,1-di(tert-butylperoxy)cyclohexane and silica, available as "Perhexa C-40" from NOF Corporation Zinc stearate: Available from NOF Corporation Formation of Cover Layers (Intermediate Layer and Outermost Layer)

Next, a sphere encased by an intermediate layer having a thickness of 1.3 mm (intermediate layer-encased sphere) was produced by injection-molding the intermediate layer-forming resin composition shown in Table 2 below over the 38.5 mm diameter core obtained as described above.

Tensile Properties (Stress-Strain Curve) of Resin Compositions

A tensile testing machine (RTG-310, from A & D Company, Ltd.) was used to carry out measurements in accordance with JIS K 7161-1 (Determination of Tensile Properties). Stress-strain curves for the resin compositions in the Examples were obtained under the following tensile test conditions: a load cell rating of 1,000 N, a testing speed of 20 mm/min and a sampling interval of 100 μm.

The elongation $\gamma_Y$ and stress $S_Y$ at the upper yield point and the elongation $\gamma_B$ and stress $S_B$ at the breaking point were determined, and the region R (shaded area in FIG. 1) enclosed by $S=f(\gamma)$ and $S=S_Y$ within the range $\gamma_Y \leq \gamma \leq \gamma_B$ was determined.

TABLE 2

| Resin compositions for intermediate layer | | A | B | C | D | E | F | G | H | I | J | K |
|---|---|---|---|---|---|---|---|---|---|---|---|---|
| Compounding ingredients (pbw) | (a) Himilan AM7318 | 100 | | 94 | 94 | 94 | 97 | 97 | 94 | 97 | 97 | 100 |
| | Surlyn 8150 | | 100 | | | | | | | | | |
| | (b) Novolak-type phenolic resin | | | 6 | 6 | 6 | | | 6 | 3 | 3 | |
| | Resole-type phenolic resin | | | | | | 3 | 3 | | | | |
| | (c) Epocros RPS1005 | | | | | 5.7 | | 2.9 | 2.9 | 2.9 | 2.9 | 2.9 |
| | (d) Hexamethylenetetramine | | | | 0.9 | 0.9 | | | 0.9 | 0.9 | 0.4 | |
| Tensile Properties | | | | | | | | | | | | |
| Resin properties | Elongation (strain) at upper yield point (%) | 10 | 9 | 9 | 9 | 9 | 9 | 9 | 9 | 11 | 10 | 9 |
| | Stress (MPa) | 16 | 18 | 16 | 16 | 16 | 16 | 16 | 17 | 16 | 16 | 15 |
| | Elongation (strain) at breaking point (%) | 317 | 285 | 327 | 185 | 208 | 298 | 296 | 275 | 309 | 291 | 321 |
| | Stress at breaking point (MPa) | 30 | 30 | 30 | 23 | 26 | 30 | 30 | 29 | 31 | 30 | 30 |
| | R (%) | 100 | 58 | 108 | 29 | 51 | 103 | 100 | 103 | 114 | 97 | 113 |
| | ΔR (%) | — | −42.1 | 8.3 | −71.1 | −48.6 | 3.0 | 0.0 | 2.8 | 13.9 | −3.1 | 12.9 |
| | Shore D hardness | 66 | 68 | 65.9 | 66.8 | 66.7 | 66.0 | 66.2 | 66.7 | 66.5 | 66.4 | 65.8 |
| | ΔH | 0.0 | 2.0 | −0.1 | 0.8 | 0.7 | 0.0 | 0.2 | 0.7 | 0.5 | 0.4 | −0.2 |
| | ΔR/ΔH | — | — | — | −94 | −71 | — | 0 | 4 | 30 | −8 | — |

R is expressed as a value relative to an arbitrary value of 100 for the R value in Comparative Example 1.
ΔR is the amount of increase with respect to the R value in Comparative Example 1.
ΔH is the amount of increase with respect to the hardness in Comparative Example 2.

Details on the intermediate layer materials are given below.
Himilan AM7318: Available from DuPont-Mitsui Polychemicals Co., Ltd. (a sodium-neutralized ionomeric resin having an acid content of about 18 wt %)
Surlyn 8150: Available from E.I. DuPont de Nemours and Company (a sodium-neutralized ionomeric resin having an acid content of about 20 wt %)
Novolak-type phenolic resin: Available from Sumitomo Bakelite Co., Ltd. under the product name "PR-50235"
Resole-type phenolic resin: Available from Arakawa Chemical Industries, Ltd. under the product name "Tamanol 526"
Epocros RPS 1005: A styrenic polymer available from Nippon Shokubai Co., Ltd.
Hexamethylenetetramine: Available under the product name "Nocrac H" (a phenolic resin curing agent) from Ouchi Shinko Chemical Industry Co., Ltd.

Next, the outermost layer material shown in Table 3, which was common to all the Examples, was injection-molded over the intermediate layer-encased sphere, thereby producing a sphere encased by a 0.8 mm thick outermost layer, this being a three-piece golf ball having a diameter of 42.7 mm. Dimples common to all the Examples and Comparative Examples were formed at this time on the ball surface.

TABLE 3

| Resin composition for outermost layer (pbw) | O1 |
|---|---|
| Pandex 8290 | 67 |
| Pandex 8283 | 22 |
| Hytrel 4001 | 11 |
| Isocyanate compound | 6.7 |
| Polyethylene wax | 2.4 |
| Titanium dioxide | 2.9 |

Details on the ingredients in the resin composition for the outermost layer are given below.

Pandex 8290, 8283: Thermoplastic polyurethanes available from DIC Covestro Polymer, Ltd.

Hytrel 4001: A polyester elastomer available from DuPont-Toray Co., Ltd.

Isocyanate compound: 4,4'-Diphenylmethane diisocyanate

Polyethylene wax: Available under the product name "Sanwax 161P" from Sanyo Chemical Industries, Ltd.

The golf balls obtained in the respective Examples and Comparative Examples were evaluated by the following method for their durability to repeated impact. The results are shown in Table 4.

Durability

Figure 2:
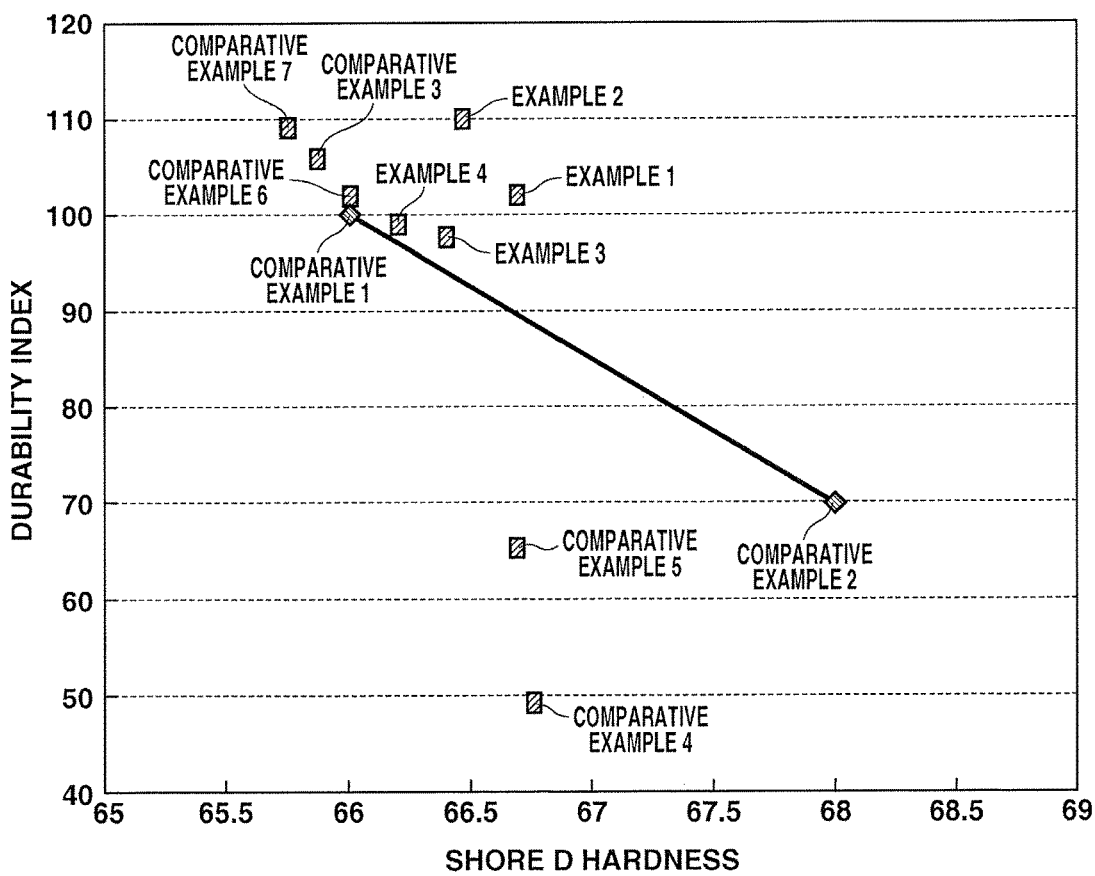
FIG. 2 is a graph showing the relationship between the durability index and the Shore D hardness in the golf balls of the Examples and Comparative Examples.

The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set to 43 m/s. The number of shots required for the golf ball to crack was measured, and the average value of the measurements taken for ten golf balls was calculated. Durability indices for the balls in the respective Examples were calculated relative to an arbitrary index of 100 for the average number of shots required for the ball obtained in Comparative Example 1 to crack, and are shown in Table 4. In addition, the relationship between this durability index and the Shore D hardness is shown in FIG. 2. In FIG. 2, the line connecting Comparative Examples 1 and 2 indicates the physical property values for ionomer-only resin materials that consist only of component (a) of the invention and do not have other ingredients blended in. The differences in durability index at the same hardness between these resin materials and the resin compositions in the respective Examples and Comparative Examples were determined, and are shown in Table 4.

TABLE 4

|  |  | Example | | | | Comparative Example | | | | | | |
|---|---|---|---|---|---|---|---|---|---|---|---|---|
|  |  | 1 | 2 | 3 | 4 | 1 | 2 | 3 | 4 | 5 | 6 | 7 |
| Core | Composition | C1 | C1 | C1 | C1 | C1 | C1 | C1 | C1 | C1 | C1 | C1 |
|  | Diameter (mm) | 38.5 | 38.5 | 38.5 | 38.5 | 38.5 | 38.5 | 38.5 | 38.5 | 38.5 | 38.5 | 38.5 |
|  | Weight (g) | 34.5 | 34.5 | 34.5 | 34.5 | 34.5 | 34.5 | 34.5 | 34.5 | 34.5 | 34.5 | 34.5 |
|  | Deflection (mm) | 3.5 | 3.5 | 3.5 | 3.5 | 3.5 | 3.5 | 3.5 | 3.5 | 3.5 | 3.5 | 3.5 |
| Cover | Intermediate layer Composition | H | I | J | G | A | B | C | D | E | F | K |
|  | Diameter (mm) | 41.1 | 41.1 | 41.1 | 41.1 | 41.1 | 41.1 | 41.1 | 41.1 | 41.1 | 41.1 | 41.1 |
|  | Weight (g) | 40.8 | 40.7 | 40.7 | 40.7 | 40.6 | 40.6 | 40.8 | 40.8 | 40.8 | 40.7 | 40.6 |
|  | Outermost layer Composition | O1 | O1 | O1 | O1 | O1 | O1 | O1 | O1 | O1 | O1 | O1 |
| Ball | Diameter (mm) | 42.7 | 42.7 | 42.7 | 42.7 | 42.7 | 42.7 | 42.7 | 42.7 | 42.7 | 42.7 | 42.7 |
|  | Weight (g) | 45.6 | 45.5 | 45.5 | 45.5 | 45.4 | 45.4 | 45.6 | 45.6 | 45.6 | 45.5 | 45.4 |
| Durability | Index based on value of 100 for Comp. Ex. 1 | 102 | 110 | 98 | 99 | 100 | 70 | 106 | 49 | 65 | 102 | 109 |
|  | Difference with ionomer at same hardness | 12 | 17 | 4 | 2 | — | — | 4 | −39 | −24 | 2 | 5 |

The following is apparent from Table 4 above and FIG. 2.

In Comparative Example 2, an ethylenic ionomer having a higher hardness than in Comparative Example 1 was used as the intermediate layer material, as a result of which the durability was poor. In Comparative Examples 3 and 6, because components (c) and (d) were not included, curing of the intermediate layer relative to Comparative Example 1 in which the resin material consisted solely of an ionomer was not observable. However, as shown in FIG. 2, it is apparent from the line indicating the correlation between Shore D hardness and the durability index that connects Comparative Example 1 and Comparative Example 2 (which line represents the physical property values of ionomer-only resin materials consisting only of component (a) of the invention in which other ingredients were not blended) that the durability index greatly decreased. By contrast, in Examples 1 to 4 which included suitable amounts of components (a), (b), (c) and (d), the hardness and durability of the intermediate layer were both good. Comparative Example 5 included components (a), (b), (c) and (d), but the amount of component (c) was excessive, as a result of which the durability was poor.

Japanese Patent Application No. 2018-229050 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball resin composition comprising:
   (a) one or both of an olefin-α,β-unsaturated carboxylic acid copolymer and a metal ion neutralization product thereof, or one or both of an olefin-α,β-unsaturated carboxylic acid-α,β-unsaturated carboxylic acid ester copolymer and a metal ion neutralization product thereof,
   (b) a phenolic resin, and
   (c) a compound having at least two oxazoline groups per molecule,
   wherein the content of component (c) is from 0.1 to 5 parts by weight per 100 parts by weight of components (a) and (b) combined, and
   wherein component (b) is a novolak-type phenolic resin.

2. The resin composition of claim 1, wherein the content of component (b) is from 1 to 20 wt % per 100 wt % of components (a) and (b) combined.

3. The resin composition of claim 1, further comprising (d) a curing agent.

4. The resin composition of claim 3, wherein component (d) is hexamethylenetetramine.

5. The resin composition of claim 3, wherein the content of component (d) is from 0.1 to 5 parts by weight per 100 parts by weight of components (a) and (b) combined.

6. The resin composition of claim 1 wherein, of the α,β-unsaturated carboxylic acid monomer serving as a constituent of the copolymer of component (a), the proportion that is not neutralized with metal ions is at least 18 wt % per 100 wt % of the copolymer of component (a).

7. The resin composition of claim 1, wherein component (a) is an ethylene-α,β-unsaturated carboxylic acid copolymer and/or a metal ion neutralization product thereof.

8. The golf ball resin composition of claim 1 wherein, in a stress-strain curve representing the relationship between stress (S) and strain (γ) obtained by measurement in accordance with JIS K 7161-1 (Determination of Tensile Properties), letting Y be an upper yield point and B be a breaking point, expressing the relationship between stress (S) and strain (γ) as the function S=f(γ), defining $\gamma_Y$ as the strain at the upper yield point, $S_Y$ as the stress at the upper yield point, $\gamma_B$ as the strain at the breaking point and $S_B$ as the stress at the breaking point, and letting R be the specific surface area of the region enclosed by S=f(γ) and $S=S_Y$ within the range $\gamma_Y \leq \gamma \leq \gamma_B$, the relationships among the Shore D hardness $H_1$ of the golf ball resin composition of claim 1, the specific surface area $R_1$ obtained from the stress-strain curve for the golf ball resin composition, the Shore D hardness $H_0$ of a resin material consisting solely of component (a) of the golf ball resin composition and lacking components (b) and (c) and the specific surface area $R_0$ obtained from the stress-strain curve for the resin material satisfy conditions (1) to (3) below $$\Delta R = R_1 - R_0 \tag{1}$$

$$\Delta H = H_1 - H_0 > 0 \tag{2}$$

$$\Delta R / \Delta H > -20. \tag{3}$$

9. A golf ball resin composition comprising:
   (a) one or both of an olefin-α,β-unsaturated carboxylic acid copolymer and a metal ion neutralization product thereof, or one or both of an olefin-α,β-unsaturated carboxylic acid-α,β-unsaturated carboxylic acid ester copolymer and a metal ion neutralization product thereof,
   (b) a phenolic resin, and (c) a compound having at least two oxazoline groups per molecule, wherein the content of component (c) is from 0.1 to 5 parts by weight per 100 parts by weight of components (a) and (b) combined, and further comprising (d) a curing agent, the component (d) being hexamethylenetetramine.

10. The resin composition of claim 9, wherein the content of component (b) is from 1 to 20 wt % per 100 wt % of components (a) and (b) combined.

11. The resin composition of claim 9, wherein the content of component (d) is from 0.1 to 5 parts by weight per 100 parts by weight of components (a) and (b) combined.

12. The resin composition of claim 9, wherein, of the α,β-unsaturated carboxylic acid monomer serving as a constituent of the copolymer of component (a), the proportion that is not neutralized with metal ions is at least 18 wt % per 100 wt % of the copolymer of component (a).

13. The resin composition of claim 9, wherein component (a) is an ethylene-α,β-unsaturated carboxylic acid copolymer and/or a metal ion neutralization product thereof.

14. The golf ball resin composition of claim 9, wherein, in a stress-strain curve representing the relationship between stress (S) and strain (γ) obtained by measurement in accordance with JIS K 7161-1 (Determination of Tensile Properties), letting Y be an upper yield point and B be a breaking point, expressing the relationship between stress (S) and strain (γ) as the function $S=f(\gamma)$, defining $\gamma_Y$ as the strain at the upper yield point, $S_Y$ as the stress at the upper yield point, $\gamma_B$ as the strain at the breaking point and $S_B$ as the stress at the breaking point, and letting R be the specific surface area of the region enclosed by $S=f(\gamma)$ and $S=S_Y$ within the range $\gamma_Y \leq \gamma \leq \gamma_B$, the relationships among the Shore D hardness $H_1$ of the golf ball resin composition of claim 1, the specific surface area $R_1$ obtained from the stress-strain curve for the golf ball resin composition, the Shore D hardness $H_0$ of a resin material consisting solely of component (a) of the golf ball resin composition and lacking components (b) and (c) and the specific surface area $R_0$ obtained from the stress-strain curve for the resin material satisfy conditions (1) to (3) below $$\Delta R = R_1 - R_0 \tag{1}$$

$$\Delta H = H_1 - H_0 > 0 \tag{2}$$

$$\Delta R / \Delta H > -20. \tag{1}$$

15. A golf ball having a core of at least one layer and a cover of at least one layer, wherein at least one layer of the cover is formed of the resin composition of claim 1.

16. The golf ball of claim 15, wherein the cover comprises at least two layers, an outermost layer and an intermediate layer interposed between the outermost layer and the core, which intermediate layer is formed of the resin composition of claim 1.

17. A golf ball having a core of at least one layer and a cover of at least one layer, wherein at least one layer of the cover is formed of the resin composition of claim 9.

18. The golf ball of claim 17, wherein the cover comprises at least two layers, an outermost layer and an intermediate layer interposed between the outermost layer and the core, which intermediate layer is formed of the resin composition of claim 9.

* * * * *